United States Patent
Lin et al.

(10) Patent No.: US 10,126,404 B2
(45) Date of Patent: Nov. 13, 2018

(54) RECEIVER GAIN OFFSET

(71) Applicant: Microsoft Technology Licensing, LLC, Redmond, WA (US)

(72) Inventors: Jyh-Han Lin, Mercer Island, WA (US); Chih-Wei Wang, Redmond, WA (US); Stephen P. DiAcetis, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/248,244

(22) Filed: Apr. 8, 2014

(65) Prior Publication Data

US 2015/0285895 A1    Oct. 8, 2015

(51) Int. Cl.
| | | |
|---|---|---|
| *G01S 5/02* | (2010.01) | |
| *H04W 4/02* | (2018.01) | |
| *G01C 21/20* | (2006.01) | |
| *H04W 4/021* | (2018.01) | |
| *H04W 4/04* | (2009.01) | |

(52) U.S. Cl.
CPC .......... *G01S 5/0252* (2013.01); *G01C 21/206* (2013.01); *G01S 5/0236* (2013.01); *H04W 4/021* (2013.01); *H04W 4/025* (2013.01); *H04W 4/043* (2013.01)

(58) Field of Classification Search
CPC ........ H04L 67/22; H04W 4/02; H04W 4/021; H04W 4/027; H04W 4/028; H04W 4/04; H04W 4/043
See application file for complete search history.

(56) References Cited

U.S. PATENT DOCUMENTS

| | | | |
|---|---|---|---|
| 9,651,656 B2 * | 5/2017 | Hall ...................... | H04W 4/029 |
| 2011/0081918 A1 * | 4/2011 | Burdo .................... | G01C 21/20 |
| | | | 455/456.1 |
| 2011/0090124 A1 * | 4/2011 | Liu ....................... | G01S 5/0289 |
| | | | 342/463 |

(Continued)

FOREIGN PATENT DOCUMENTS

WO    2006017266 A2    2/2006

OTHER PUBLICATIONS

"International Preliminary Report on Patentability Issued in PCT Application No. PCT/US2015/023753", dated Jun. 24, 2016, 10 Pages.

(Continued)

*Primary Examiner* — Liton Miah
(74) *Attorney, Agent, or Firm* — Workman Nydegger

(57) ABSTRACT

The description relates to receiver gain offset. One example can obtain data sensed by a mobile device at a position. The example can evaluate the sensed data and survey data to identify a venue proximate to the position. The survey data of the venue can be organized into regions and then individual regions can be organized into sub-regions. The example can compare signal strengths of the sensed data to signal strengths of the survey data to identify the position relative to an individual region. The comparison can utilize a receiver gain offset estimation between the mobile device and another device that acquired the survey data. The example can refine the receiver gain offset estimation and attempt to identify the position relative to an individual sub-region within the individual region utilizing the refined receiver gain offset estimation.

6 Claims, 7 Drawing Sheets

(56) References Cited

U.S. PATENT DOCUMENTS

| | | | |
|---|---|---|---|
| 2013/0003572 A1 | 1/2013 | Kim et al. | |
| 2013/0281116 A1 | 10/2013 | Cho et al. | |
| 2014/0141796 A1* | 5/2014 | Marti | G01S 5/0252 455/456.1 |
| 2014/0141803 A1* | 5/2014 | Marti | H04W 4/043 455/456.2 |
| 2014/0231502 A1* | 8/2014 | Marsico | G06F 17/30876 235/375 |
| 2015/0018018 A1* | 1/2015 | Shen | H04W 4/04 455/457 |

OTHER PUBLICATIONS

"Second Written Opinion Issued in Patent Application No. PCT/US2015/023753", dated Mar. 16, 2016, 09 Pages.

Borenovic, et al., "Positioning in WLAN Environment by Use of Artificial Neural Networks and Space Partitioning", In Annals of Telecommunications, vol. 64, Issue 9, Oct. 1, 2009, 12 Pages.

Chen, et al., "Survey of WLAN Fingerprinting Positioning System", In First National Conference For Engineering Sciences, Nov. 7, 2012, 6 Pages.

Francescantonio, et al., "A Cooperative Framework for Path Loss Calibration and Indoor Mobile Positioning", In IEEE 7th Workshop on Positioning Navigation and Communication, Mar. 11, 2010, 7 Pages.

Laoudias, et al., "Crowdsourced Indoor Localization for Diverse Devices Through Radiomap Fusion", In IEEE International Conference on Indoor Positioning and Indoor Navigation, Oct. 28, 2013, 7 Pages.

Laoudias, et al., "Device Signal Strength Self-Calibration Using Histograms", In IEEE International Conference on Indoor Positioning and Indoor Navigation, Nov. 13, 2012, 4 Pages.

Li, et al., "Experiencing and Handling the Diversity in Data Density and Environmental Locality in an Indoor Positioning Service", In Proceedings of the 20th Annual International Conference on Mobile Computing and Networking, Sep. 7, 2014, 12 Pages.

"International Search Report and Written Opinion Issued in PCT Application No. PCT/US2015/023753", dated Aug. 20, 2015, 16 Pages.

Pulkkinen, et al., "AWESOM: Automatic Discrete Partitioning of Indoor Spaces for WiFi Fingerprinting", In Book—Pervasive Computing—10th International Conference, Jun. 18, 2012, 18 Pages.

* cited by examiner

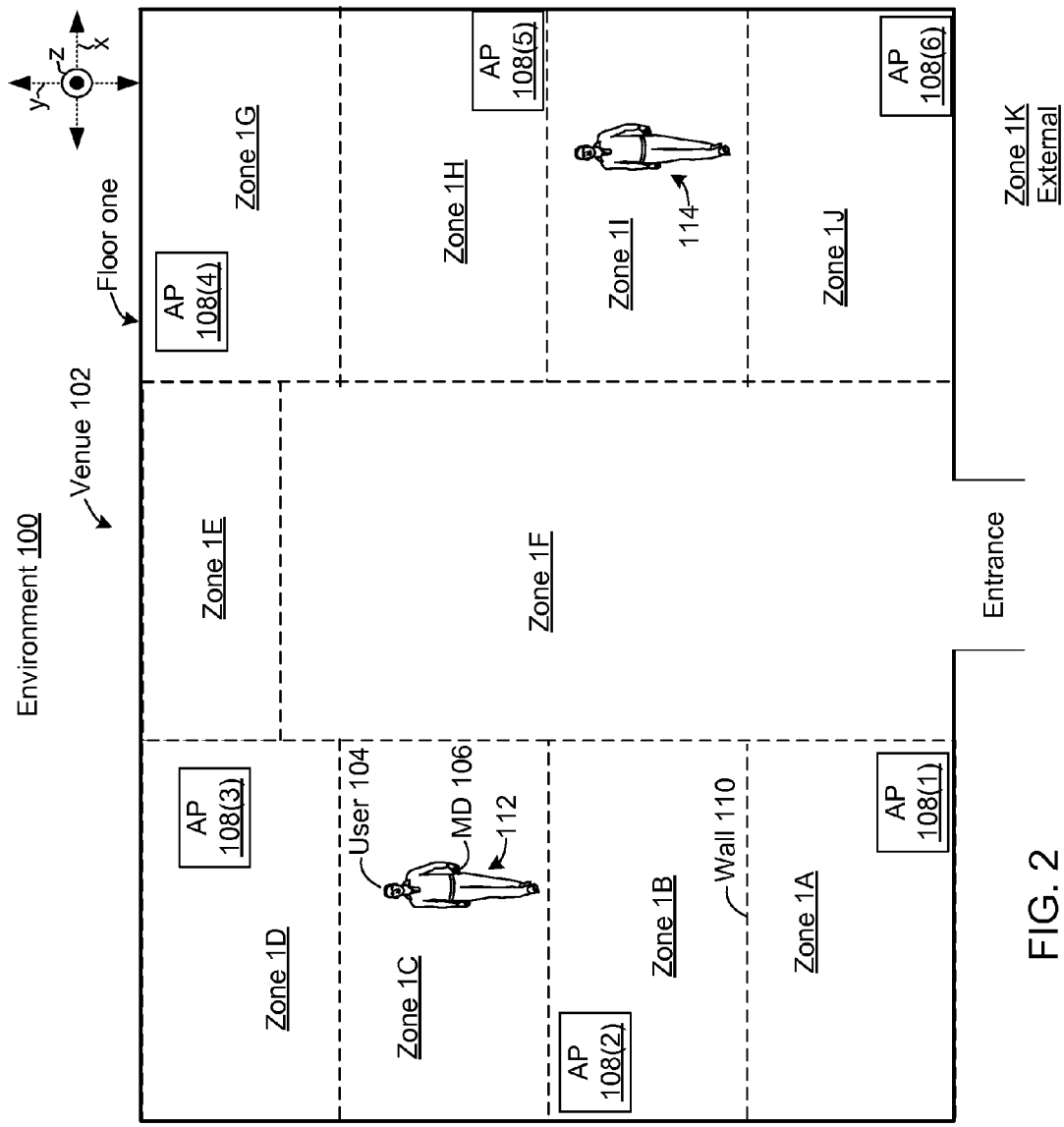
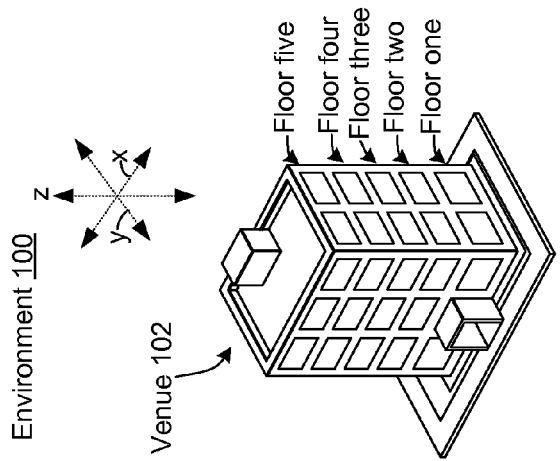
FIG. 1
FIG. 2

RECEIVER GAIN OFFSET

BACKGROUND

Many mobile device users want their mobile device to provide them with location-related features. For instance, the user may want directions to get from their current location to a specific location. In many circumstances, the mobile device's location is determined using relative position techniques that compare the information sensed by the mobile device to information that was previously obtained by other devices. The accuracy of results produced by relative position techniques can be enhanced by compensating for differences between the mobile device and the previous devices. However, this compensation can be extremely resource intensive. For instance, calculations to determine the mobile device's location that include the compensation can be so time-consuming that the user is annoyed by the associated delay.

SUMMARY

The described implementations relate to receiver gain offset. One example can obtain data sensed by a mobile device at a position. The example can evaluate the sensed data and survey data to identify a venue proximate to the position. (Survey data is discussed below, such as relative to FIG. 6). The survey data of the venue can be organized into units or regions and then individual regions can be organized into sub-regions (or sub-units). The example can compare signal strengths of the sensed data to signal strengths of the survey data to identify the position relative to an individual region. The comparison can utilize a receiver gain offset estimation between the mobile device and another device that acquired the survey data. The example can refine the receiver gain offset estimation and attempt to identify the position relative to an individual sub-region within the individual region utilizing the refined receiver gain offset estimation.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 1-2 show an example scenario or environment upon which the present mobile device location concepts can be employed in accordance with some implementations.

DETAILED DESCRIPTION

Overview

Figure 3:
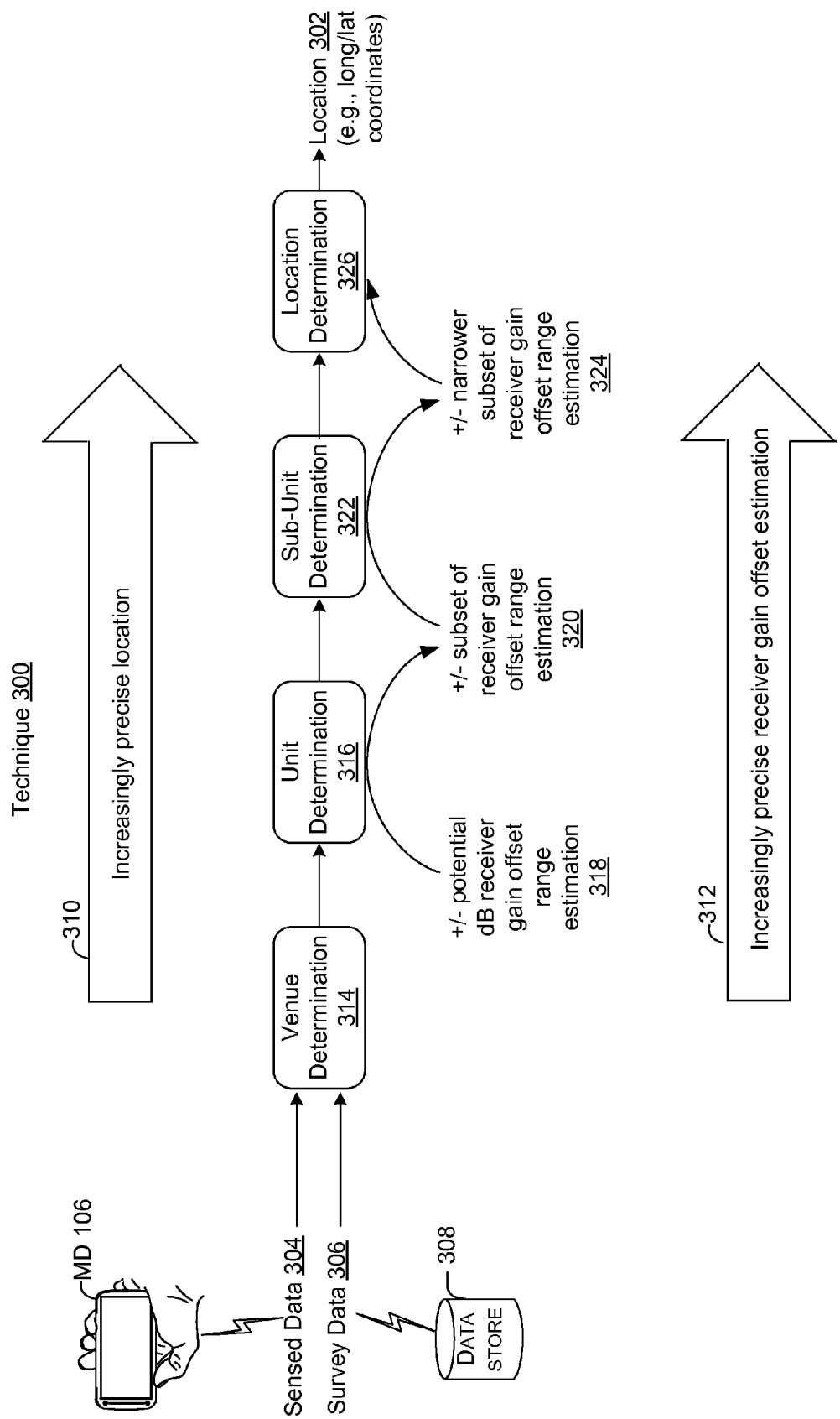
FIG. 3 shows an example location technique diagram in accordance with some implementations.

Many users have come to rely on their mobile devices to tell them where they are and/or to guide them to their desired destination (and/or for other uses). Outside in open areas, the mobile device may utilize an absolute positioning technology, such as global positioning system (GPS) (or other global navigation satellite system) to determine the user's location. Alternatively or additionally, various relative positioning technologies may be employed. For instance, geographic features or manmade structures can render GPS inoperable and increase reliance upon relative positioning technologies. For example, in many cases a desired destination may be a venue or within a venue. "Venue" can mean a building, such as a shopping mall, convention center, office building, or a tunnel system, such as a subway or a sewer system, or any other natural or man-made feature, among others. Often absolute positioning technologies do not work reliably in venues due to signal loss. In such cases, relative positioning technologies can be utilized.

Relative positioning technologies can compare signals sensed by one device to signals sensed by another device. The devices tend to have different sensing capabilities or sensitivities (e.g., receiver gains). Receiver gain differences exist between different models and types from the same or different manufacturers and even within devices of an individual model. For instance, it is not unusual for the receiver gain difference to be as large as 20-30 decibels (dB). Thus, relative positioning technologies that use received signal strengths can be more accurate when receiver gain differences are considered. Furthermore, in some implementations, the receiver gain difference can be estimated in real-time at a large scale, further contributing to resource issues, such as timeliness of providing results to the user.

In some configurations, signals can be gathered and stored for various regions, such as venues. For instance, the stored signals can include a unique identification of a device, such as a wireless access point that produced the signal, the signal strength, and a venue at which the signal was sensed. In some cases, the venues can be surveyed with a device to gather the signals. The survey data can be used to build statistical models for signal strengths per access point.

Rather than just relating the gathered signal strengths to the venue generally, some implementations can progressively divide the venue into increasingly precise levels of granularity (e.g., smaller more precise units). For instance, the venue can be divided into units, such as by floor. Then each unit can be divided into sub-units. For example, each floor can be divided into zones. Thus, an individual venue can have tens or hundreds of floors and hundreds or thousands of zones. These smaller units tend to enable a more accurate location of a subsequent mobile device to be determined than less precise units. However, as the level of granularity increases the ability to compensate for receiver gain differences between the survey device and the mobile device can become more computationally intensive. Stated another way, considering receiver gain offset for a computation relative to a venue may not be particularly resource intensive, but considering receiver gain offset relative to hundreds or thousands of zones within the venue can be very resource intensive.

To combat this trend, the present implementations can utilize a progressive receiver gain offset range. (The terms "receiver gain offset range" and "receiver gain estimation" are used interchangeably in this document). Initially, the receiver gain offset range can cover a wide range of values at the first level of venue granularity (e.g., the floor as a unit). Then a sub-range of receiver gain offset values can be utilized in the computations at the next level of granularity (e.g., the zone as a sub-unit). The calculations for the next level of precision, such as determining a coordinate location of the mobile device, within an individual zone of the venue can utilize the sub-range of the receiver gain estimate values or an even narrower sub-sub-range of values. Thus, from one perspective, a progressive receiver gain offset can be utilized by chaining together the analysis of increasingly more precise units of the venue and progressively refining the receiver gain estimate based upon the earlier analysis.

Environment Examples

For purposes of explanation, consider introductory FIGS. 1-2 of an environment 100 in which the present concepts can be employed. In this case the environment includes a venue 102 and a user 104 (FIG. 2) that has a mobile device 106 (FIG. 2). In this example, venue 102 is manifest as a retail/office building, though of course this is not intended to limit the type of venues covered by the present concepts. For purposes of providing location related services, the venue can be organized into units or regions. These regions can be identified in survey data relating to the venue. An example technique for obtaining survey data is described below relative to FIG. 6. Briefly, survey data can relate physical features of the venue to location related information sensed proximate the venue. For example, this sensed data can relate to sensed signals, such as radio frequency (RF) signals from wireless access points, cell towers etc. at various locations proximate to the venue. Note that in the description that follows this sensed data is referred to as 'survey data' or 'survey values' to distinguish from sensing performed by the mobile device 106 that is seeking location based guidance. Sensing information from this mobile device 106 is referred to as 'sensed data' or 'sensed values'. This distinction should become apparent from the discussion that follows.

In this example, the units of venue 102 represent floors of the building (e.g., floor one, floor two, floor three, floor four, and floor five). Of course other units could be utilized, such as vertical slices through the building along an xz reference plane or a yz reference plane. Further, individual units of the venue can be organized at a finer level of granularity. For instance, FIG. 2 shows floor one organized into zones 1A-1K. The zones can be based upon logical and/or physical features of the floor. In this example, floor one includes six wireless access points 108(1)-108(6). In this case, zone 1F represents a generally open interior atrium of floor one of venue 102. The open atrium can have generally consistent RF signal propagation properties throughout, at least when compared to adjacent zones that have walls, furniture, retail displays, etc. For instance, a wall 110 between zone 1A and zone 1B can increase signal attenuation and cause significantly different RF signals to be detected between the two zones. Alternatively or additionally, the wall can cause significantly different signal strengths for a detected individual wireless access point, such as wireless access points 108(1) and/or 108(2). Note that likely the upper floors, such as floor two, include wireless access points that are detectable on the zones of floor one, but for sake of brevity the present discussion relates to illustrations in a two dimensional manner relative to floor one.

At this point in the discussion, assume that survey data exists for venue 102 and that the user 104 with mobile device 106 is at position 112. (Note that the mobile device is difficult to visualize at the scale of FIG. 2). The mobile device 106, such as upon receiving a command from the user, may attempt to identify a location of position 112. In this case, the mobile device can detect RF signals from one or more of the wireless access points 108. Unique identifiers in the detected RF signals can be mapped to venue 102. For instance, the survey data can indicate that wireless access point 108(2) transmitting a unique identifier 'x' is located in venue 102. Upon determining the venue, the mobile device may desire a more precise location of the position within the venue. As such, sensed signals strengths of RF signals detected at position 112 can be compared to sensed signal strengths in the survey data to determine what floor of the venue the mobile device is located. This comparison is more accurate if differences in receiver sensitivity between the mobile device and the survey device are accounted for. In fact, in some implementations accounting for the differences is a key aspect for achieving accurate location estimations.

Briefly, a receiver gain offset estimation can be determined for the mobile device relative to the survey device. As noted above, different devices can have widely different receiver gain sensitivities. For example, receiver gain sensitivities of +/−30 dB are often encountered between various devices. This receiver gain estimate range of +/−30 dB can be considered when comparing sensed signals from position 112 to surveyed signals from floors one through five. The +/−30 dB receiver gain estimate range can add substantial computational complexity to the comparison. However, since there are relatively few floors, the complexity can generally be managed without undue resource consumption. Further, the comparison can yield information about the true receiver sensitivity differences between the survey device and the mobile device. For instance, the computations can determine that the receiver gain sensitivity values for the survey device and mobile device 106 are actually within +/−10 dB, for example.

To get even more precise location information, the position 112 can be determined relative to a zone of floor one. As with the floor comparison, the sensed data can be compared to survey data for the zones of floor one in light of the receiver gain differences between the mobile device and the survey device. However, in this case, rather than utilize the hypothetical extreme receiver gain offset range of +/−30 dB, the technique can utilize the determined receiver gain offset range of +/−10 dB, thereby reducing the complexity of the calculations. Assume that the zone detection calculations indicate that the mobile device is in zone 1C. This process may further refine the receiver gain offset range. For instance, the actual receiver gain sensitivity differences between the two devices may be determined to be +/−5 dB.

Once the zone detection calculations determine that the mobile device is in an individual zone, in this case zone 1C, trilateration can be utilized to determine the location within the zone by using zone based wireless access point trilateration. Again, this calculation can be made based upon the +/−5 dB receiver gain sensitivity difference between the two devices determined from the zone calculations. So for instance, in this example, the trilateration can determine that the mobile device is at hypothetical latitude s and longitude t in zone 1C of floor one of venue 102. The calculations to determine the latitude and longitude can be simplified by the ability to use the determined +/−5 dB receiver gain offset range rather than the full potential +/−30 dB receiver gain offset.

Further, the determined receiver gain offset range of +/−5 dB can be stored by the mobile device for subsequent use. For instance, assume that the user subsequently carries the mobile device to position 114. The stored receiver gain offset can be utilized to calculate floor, zone, and/or location at the new position utilizing the determined receiver gain offset range of +/−5 dB rather than starting from scratch with the potential +/−30 dB receiver gain offset range estimation. As such, the calculations at the second position 114 can be greatly simplified from a resource usage standpoint. Viewed from another perspective, some implementations can store the estimated receiver gain offset. This receiver gain offset can be utilized in subsequent calculations. If the receiver gain offset is refined in the subsequent calculations, the refined value can then be saved in place of the former receiver gain offset. Then the refined receiver gain offset can be utilized in still further calculations relating to device location estimations.

Progressive Receiver Gain Offset Examples

FIG. 3 shows an example technique that can utilize progressive receiver gain offset to determine a location 302 of the user's mobile device 106. In this case, the mobile device obtains sensed data 304 at a position. The sensed data can be compared to survey data 306 stored in a data store 308. Generally, technique 300 can determine the mobile device's location 302 with increasing precision at 310 by using an increasingly precise receiver gain offset estimation 312.

At 314, venue determination can be performed on the sensed data 304 and the survey data 306. The sensed data can relate to sensed signals and identification (IDs) of transmitting devices (such as wireless access points 108 of FIG. 2). For instance, the sensed data could be in the form of ID(1), signal strength(1), ID(2), signal strength(2), and ID(n), signal strength(n). This sensed data can be referred to as a sensed fingerprint or sensed signature. The venue determination can be based upon matching device IDs from the sensed data to the same IDs in the survey data. The survey data can map the IDs to an individual venue. Stated another way, the venue determination can compare the sensed fingerprint to survey fingerprints while considering receiver gain offset.

At 316, unit determination can be performed relative to the individual venue determined at 314. As mentioned above, the units can be any type of organizational unit that is a portion of the venue. As discussed above relative to FIGS. 1-2, floors are commonly employed units. The unit determination can compare the signal strength of individual transmitting devices in the sensed data to those in the survey data. As mentioned above, the comparison can be more accurate if potential receiver gain differences between the mobile device and the survey device are accounted for. The unit determination 316 can utilize a wide potential receiver gain offset range 318 to help ensure that essentially all scenarios are covered (e.g., one device has a very sensitive receiver configuration and one has a much less sensitive receiver configuration). As indicated at 320, the technique of unit determination can refine the receiver gain offset estimation to a subset of the potential receiver gain offset range.

At 322, sub-unit determination can be performed relative to the unit identified in the unit determination at 316. The sub-unit determination 322 can analyze the sensed data and the survey data in light of the subset of the receiver gain offset range estimation 320. The sub-unit determination can identify an individual sub-unit of the unit for the mobile device. The sub-unit determination can also refine the subset of the receiver gain offset range estimation 320 to a narrower subset of the receiver gain offset range estimation 324.

At 326, location determination can be performed on the sensed data and the survey data relative to the identified sub-unit in light of the narrower subset of the receiver gain offset range estimation 324. Utilizing this information, the location determination 326 can identify the location 302 of the mobile device 106.

In summary, location accuracy can be improved and/or resource consumption can be reduced by utilizing progressive receiver gain offsets. For example, the unit determination 316 could be calculated with a +/−30 dB range (e.g., 61 values centered on zero). This range could be refined to for example +/−5 dB centered on positive 10 (e.g., 11 values) during unit determination. The range can be further refined to, for example, +/−3 dB centered on positive 9 (e.g., 7 values) during the sub-unit determination 322. The 7 value range can be utilized in the location determination 326 rather than the 61 values of the original range. Of course, this example is provided for purposes of explanation and is not intended to be limiting.

Positioning System Model Examples

Figure 4:
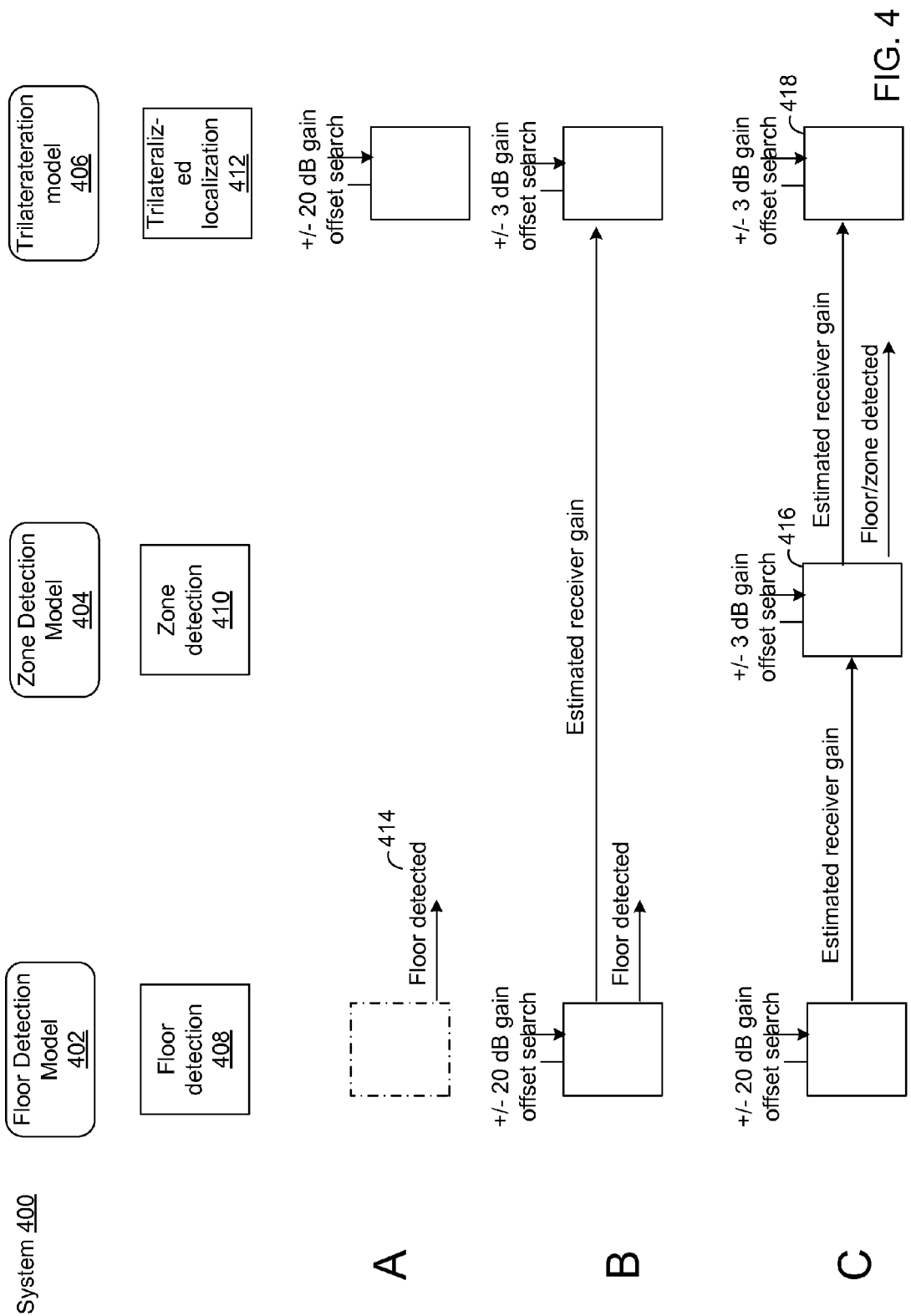
FIGS. 4-5 show example location systems in accordance with some implementations.

FIG. 4 shows example models that can be utilized in a positioning (e.g., location) system 400. As mentioned above, positioning systems capable of internal positioning can consist of multiple models that relate to increasingly precise units or regions. For instance, this example positioning system 400 can include a floor detection model 402, a zone detection model 404, and a trilateration model 406. Note that system 400 can also employ a venue determination model. Venue determination models can function without receiver gain offset estimation so this feature is not illustrated for sake of brevity. Venue detection or determination is described above relative to FIG. 3.

In system 400, relative to sensed data the floor detection model 402 can perform floor detection 408. Similarly, the zone detection model 404 can perform zone detection 410 and the trilateration model 406 can obtain or detect a trilateralized location 412. Note that floor detection and zone detection are examples of unit determination and sub-unit determination, respectively, which are discussed above relative to FIG. 3. In system 400 floor detection is discussed relative to a vertical column directly beneath the floor detection model 402, zone detection is discussed relative to a vertical column directly beneath the zone detection model 404, and trilateration is discussed in a vertical column directly beneath the trilateration model 406. In this light, three example location techniques "A," "B," and "C" are discussed and compared. The techniques relate to horizontal rows of FIG. 4 and entail some or all of the model 402, 404, and/or 406.

Technique A can be thought of as a traditional technique where a floor is detected at 414 without utilizing receiver gain offset. Information about the floor can be utilized by the trilateration model 406. The trilateration model also considers a wide potential receiver gain offset range estimation between the mobile device and the survey device. In this example the wide potential receiver gain offset range estimation is +/−20 dB. Utilizing the wide potential receiver gain offset range estimation can be very resource intensive and/or can provide inconclusive results. For instance, the technique may be unable to settle on a location and instead may return different locations if run multiple times on the same data.

Technique B can entail the floor detection model starting with the wide potential receiver gain offset range estimation of +/−20 dB to determine the floor of the venue. As part of the floor determination process the floor detection model can estimate a sub-range of the receiver gain offset range estimation (in this example +/−3 dB). The sub-range of the estimated receiver gain can be utilized by the trilateration model to determine the location. However, without considering elements within the floor that can affect the signal attenuation, location results tend to be inaccurate.

Technique C can entail the floor determination model 402 operating in a similar fashion to technique B. (In some ways, technique C can be thought of as another way to represent some of the concepts described above relative to FIG. 3). In the example of FIG. 4, relative to technique C, the floor determination model can utilize the wide potential receiver gain offset range estimation of +/−20 dB to determine the floor of the venue and can determine a sub-range of the receiver gain offset. The floor determination model can provide the sub-range of the receiver gain offset to the zone detection model 404. At 416 the zone detection model can identify an individual zone of the floor where the mobile device is at. The zone detection model may further refine the sub-range of the receiver gain offset. Further, zones can have more accurate attenuation models than an entire floor. As such, knowing the zone can enhance the accuracy of further comparisons between the sensed data and the survey data. As such, the trilateration model 406 can operate on the information from the zone detection model about the individual zone, attenuation information for that zone, and the sub-range of the receiver gain offset (or a further refinement thereof) to calculate the location of the mobile device at 418.

Various techniques can be utilized by the floor detection model 402, the zone detection model 404, and/or the trilateration model 406 to estimate receive gain offset. Maximum likelihood (ML) and least error (LE) are examples of two of these techniques. In some implementations of the present concepts, the floor detection model and the zone detection model can employ the maximum likelihood technique and the trilateration model can employ the least error technique.

In summary, when operating independently, each model 402, 404, and 406 needs to account for a receiver gain offset range of at least −20 to +20 dB. The computational cost increases proportionally with range and the complexity of the model. Among the three models, the receiver gain offset estimate from zone detection tends to be the most accurate but computationally most expensive due to the large number of zones. In many configurations, with −20 to +20 dB estimated receiver gain offset range, using zone detection for gain offset estimation is not practical for real-time operation. On the other hand, receiver gain offset estimate in floor detection tends to be more affordable from a resource perspective but less optimal. In addition, receiver gain offset estimate in trilateration tends to suffer from inconsistency when it needs to search a large receiver gain offset range.

Implementations represented by technique C can overcome these shortcomings by chaining these methods together and estimating receiver gain offset progressively. From one perspective, the term "progressive," can mean applying the full range in the receiver gain estimate of floor detection 408 and then feeding the estimate to the zone detection 410 for "progressive" refinement using a smaller range; then finally feeding the estimate from zone detection to trilateration location (detection) 412 using a potentially even smaller range for the receiver gain offset.

As mentioned above, some implementations of floor detection model 402, zone detection model 404, and/or trilateration model 406 can utilize least error (LE) and/or maximum likelihood (ML) methods for estimating receiver gain offsets between the survey device and the mobile device.

Details regarding implementing the maximum likelihood method are provided directly below followed by details regarding the least error method.

Receiver gain offset estimation maximum likelihood (ML) method:

$$\arg\max_{R} \max_{i} \prod_{j} Prob(AP_{ij} = rssi_j + R \mid zone_i)$$

R: Receiver gain offset
$zone_i$: The ith zone
$AP_{ij}$: Normalized received power from $AP_j$ in $zone_i$, where AP represents "access point"
$rssi_j$: Received power from $AP_j$ in the fingerprint
Receiver gain offset estimate—Least Error (LE) method:

$$\arg\min_{R} \min_{x_j} \sum_{j} \left| p_{ij} - P_i + R + 10\gamma_i \log_{10} \sqrt{(c_i - x_j)^T (c_i - x_j)} \right|$$

R: Receiver gain offset
$P_i$: Power of $AP_i$
$\gamma_i$: Path loss exponent of $AP_i$
$c_i$: Position of $AP_i$
$x_j$: Possible position j
$p_{ij}$: Received power from $AP_i$ at position $x_j$ In some implementations, the floor detection model 402 and the zone detection model 404 can employ the maximum likelihood method and the trilateration model 406 can employ the least error model. Of course, other configurations are contemplated.

Figure 5:
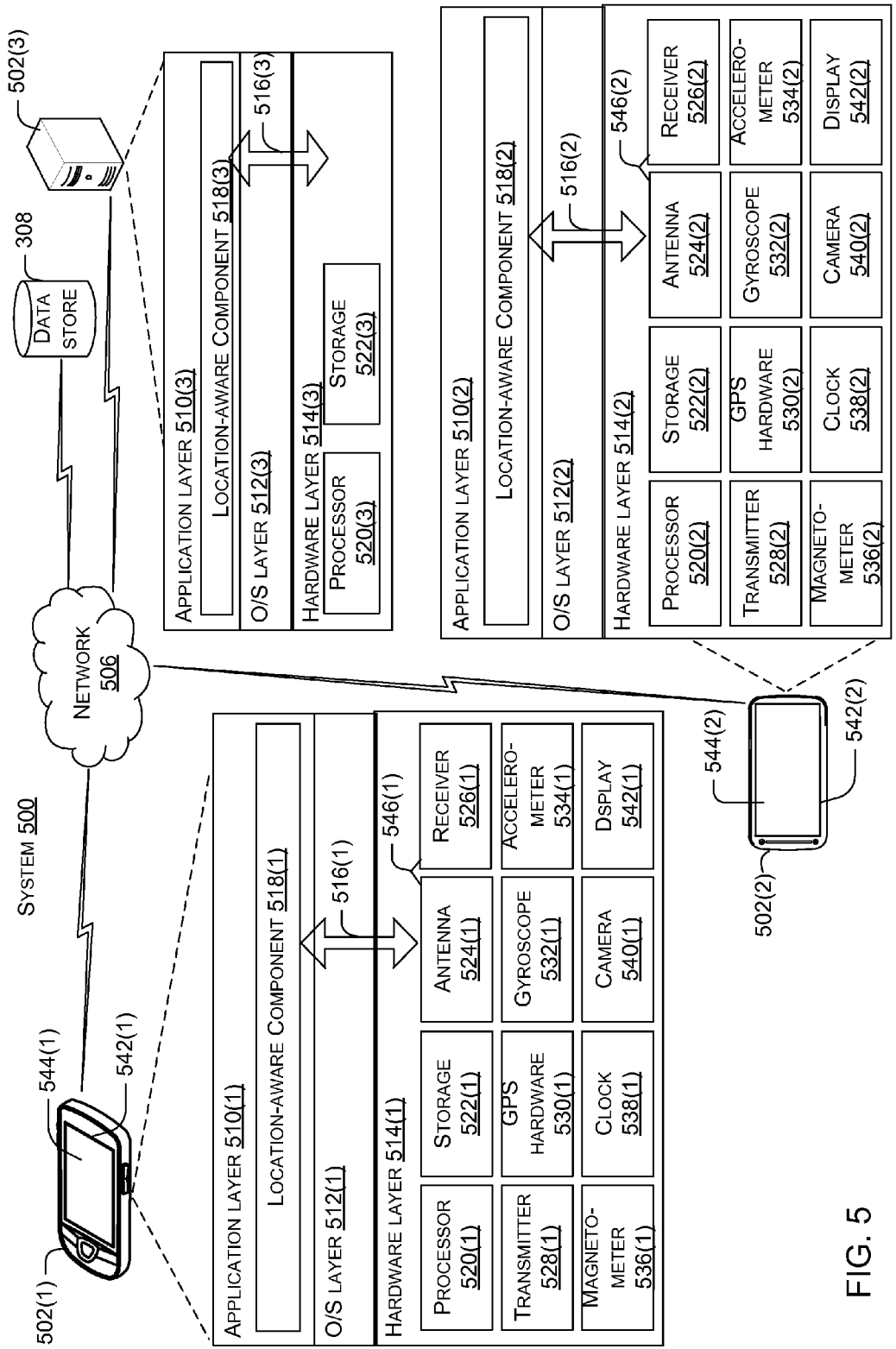

FIG. 5 shows an example system 500 that includes multiple devices 502. In this case, devices 502(1) and 502(2) are mobile devices that can be similar to mobile device 106 described above relative to FIGS. 1-3. Note also that either of devices 502(1) and/or 502(2) could alternatively function as a survey device (discussed above and below but not specifically illustrated). Device 502(3) can be a server type computing device that is remote from the mobile device. System 500 can also include data store 308 and one or more networks 506 over which the devices 502 can communicate with one another and/or the data store. As mentioned above, survey data relating to specific venues can be stored on data store 308. For the sake of brevity, elements of the three devices 502(1), 502(2), and 502(3) are discussed generically where feasible. When an individual device is discussed, the appropriate suffix "(1)," "(2)," or "(3)" is utilized, otherwise the discussion can be generic to the devices.

Generally, devices 502 can include an application layer 510, an operating system (O/S) layer 512, and a hardware layer 514. Drivers 516 can facilitate interaction between the hardware layer and the operating system layer and the application layer. In this configuration, the application layer 510 can include a location-aware component 518. The location-aware component is discussed in more detail below.

The hardware layer 514 can include a processor 520 and storage 522. Relative to devices 502(1) and 502(2), the hardware layer 514 can further include an antenna 524, a receiver 526, a transmitter 528, GPS hardware 530, a gyroscope 532, an accelerometer 534, a magnetometer 536, a clock 538, a camera 540, and/or a display 542, among others. Location related graphical user interfaces (GUIs) 544 can be presented on the display 542. For instance, the GUI can include a visualization of a map from a present location to a desired location in a venue and/or associated directions.

GPS hardware 530, gyroscope 532, accelerometer 534, and magnetometer 536 can be thought of as examples of sensors 546 that can provide location related information.

The antenna 524 and the receiver 526 can also collectively function as a sensor 546. GPS hardware 530 can function to provide absolute location information for the device. The antenna 524 and the receiver 526, gyroscope 532, accelerometer 534, and/or magnetometer 536 can provide relative location information about the location of the device.

Any of the elements of a device, such as device 502(1) can contribute to receiver gain offset compared to other devices, such as device 502(2). For instance, the size, position, and/or number of antennas 524 can affect signal sensitivity. Similarly, an amplifier and/or analog-to-digital converter of the receiver 526 as well as its sampling rate, resolution, and/or signal-to-noise ratio, among others, can influence signal sensitivity. Further, calibration techniques can influence signal sensitivity. These are just a few of the elements that can influence signal sensitivity on one device compared to another.

Relative to devices 502(1) and 502(2), the antenna 524 and the receiver 526 can function to sense radio frequency signals. The location-aware component can cause the signals to be stored on the device, such as on storage 522 and/or send the signals to the data store 308 for storage. The location-aware component 518 can alternatively obtain survey data for nearby venues and compare the sensed signals to the survey signals to identify the location of the device. Toward this end, the location-aware component 518 can employ the techniques described above relative to FIGS. 1-4 and/or include elements described relative to FIGS. 1-4, such as the floor detection model 402, zone detection model 404, and/or trilateration model 406 described above relative to FIG. 4.

Note also, that the role of a device is not fixed. For instance, device 502(1) could function as a survey device to survey one venue and subsequently function as a user device that is trying to identify its location in another venue.

Note that in some configurations, location-aware component 518(3) of device 502(3) can provide location services to either or both of device 502(1) and/or 502(2). For instance, device 502(3) can request sensed data from device 502(1) (and/or otherwise attempt to identify a location of device 502(1)). Location-aware component 518(3) could then request survey data from data store 308 for venues proximate to device 502(1).

The location-aware component 518(3) could compare the sensed data from device 502(1) to the survey data to identify a specific location of device 502(1). As mentioned above, this process can produce a progressively refined receiver gain offset for the device 502(1) relative to the survey device. The location-aware component 518(3) can send the specific location information to device 502(1) along with the receiver gain offset and/or other information. The receiver gain offset can be in various forms, such as a tag. The tag can be time and/or location stamped. In one case, the receiver gain offset estimate can be sent with a tag that identifies the model version (for that venue) used for positioning (e.g., determining device location). The tag could be stored on the device 502(1) and utilized for calculating its location at subsequent instances where the tag was still valid (e.g., relative to the time, location, and/or changes to the floor detection model 402, zone detection model 404, and/or trilateration model 406 described above relative to FIG. 4). Alternatively to using the tag itself, location-aware component 518(1) can submit the receiver gain offset and its tag in future indoor positioning requests to the location-aware component 518(3). When the location-aware component 518(3) receives the request, it can first check if the receiver gain offset is still usable by checking if the tag is still up to date. If so, the location-aware component 518(3) can limit the receiver gain offset range to the refined receiver gain offset (and practically bypass the cost of receiver gain offset estimation).

Thus, rather than calculating the receiver gain offset each time location services are requested, the receiver gain offset can be re-used as appropriate to reduce resource consumption.

The other information sent with the location and the tag can be manifest in many different forms. For instance, the other information could include a map and instructions for the user to get from the current location to a desired location. For example, the map could be displayed on the GUI 544(1) with accompanying instructions to guide the user to the desired location.

In the above example the remote location-aware component 518(3) provided services on behalf of the device 502(1). In other configurations, location-aware component 518(1) on device 502(1) can act in a robust manner, such that all location-based processing, including determining the receiver gain offset is performed on the device. The device 502(1) could request relevant survey data from the data store 308 and perform the processing on the device rather than relying on remote services provided by the location-aware component 518(3).

In summary, many different device and system configurations are contemplated. Some configurations can employ a relatively thin location-aware component 518(1) on the device. In other configurations, location-aware component 518(1) can be more robust. For instance, the location-aware component 518(1) can communicate directly with the data store 308 and download information about local venues for caching on device 502(1). In such a configuration, all of the processing can be performed locally on device 502(1) by location-aware component 518(1). In another configuration, more or all of the processing can be performed by remote device 502(3) with the results presented on device 502(1). Also, in the illustrated configuration the data store 308 is independent from the remote device 502(3). In other configurations, the remote device 502(3) may maintain the data store 308.

As mentioned above, devices 502 can be thought of as computers or computing devices as defined to be any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage/memory. The storage/memory can be internal and/or external to the computer. The storage/memory can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media can include "computer-readable storage devices". Examples of computer-readable storage devices include volatile storage media, such as RAM, and non-volatile storage media, such as hard drives, optical discs, and flash memory, among others.

Examples of devices 502 can include traditional computing devices, such as servers, personal computers, desktop computers, notebook computers, cell phones, smart phones, personal digital assistants, pad type computers (e.g., tablets), mobile devices, wearable smart devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected (e.g., wired) to a network, such as with an Ethernet cable, and wirelessly communicate with devices over radio channels, such as radio white space channels and/or Wi-Fi channels, among others.

In the illustrated implementation, devices 502 are configured with general purpose processors and storage/memory. In some configurations, such devices can include a system on a chip (SOC) type design. In such a case, functionalities can be integrated on a single SOC or multiple coupled SOCs. In one such example, the computing device can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include any of GPS hardware 530, gyroscope 532, accelerometer 534, and/or magnetometer 536.

Shared resources can be storage, processing units, etc. that can be used by multiple functionalities. In this example, the shared resources can include the processor and/or storage/memory. In one case, the location-aware component 518 can be implemented as dedicated resources. In other configurations, this component can be implemented on the shared resources and/or the processor can be implemented on the dedicated resources.

In some configurations, the location-aware component 518 can be installed during manufacture of the device 502 or by an intermediary that prepares the device for sale to the end user. In other instances, the end user may install the location-aware component, such as in the form of a downloadable application or from a USB thumb drive, among others.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted manner that limits the use of the information to accomplishing the present location based concepts.

Survey Examples

Figure 6:
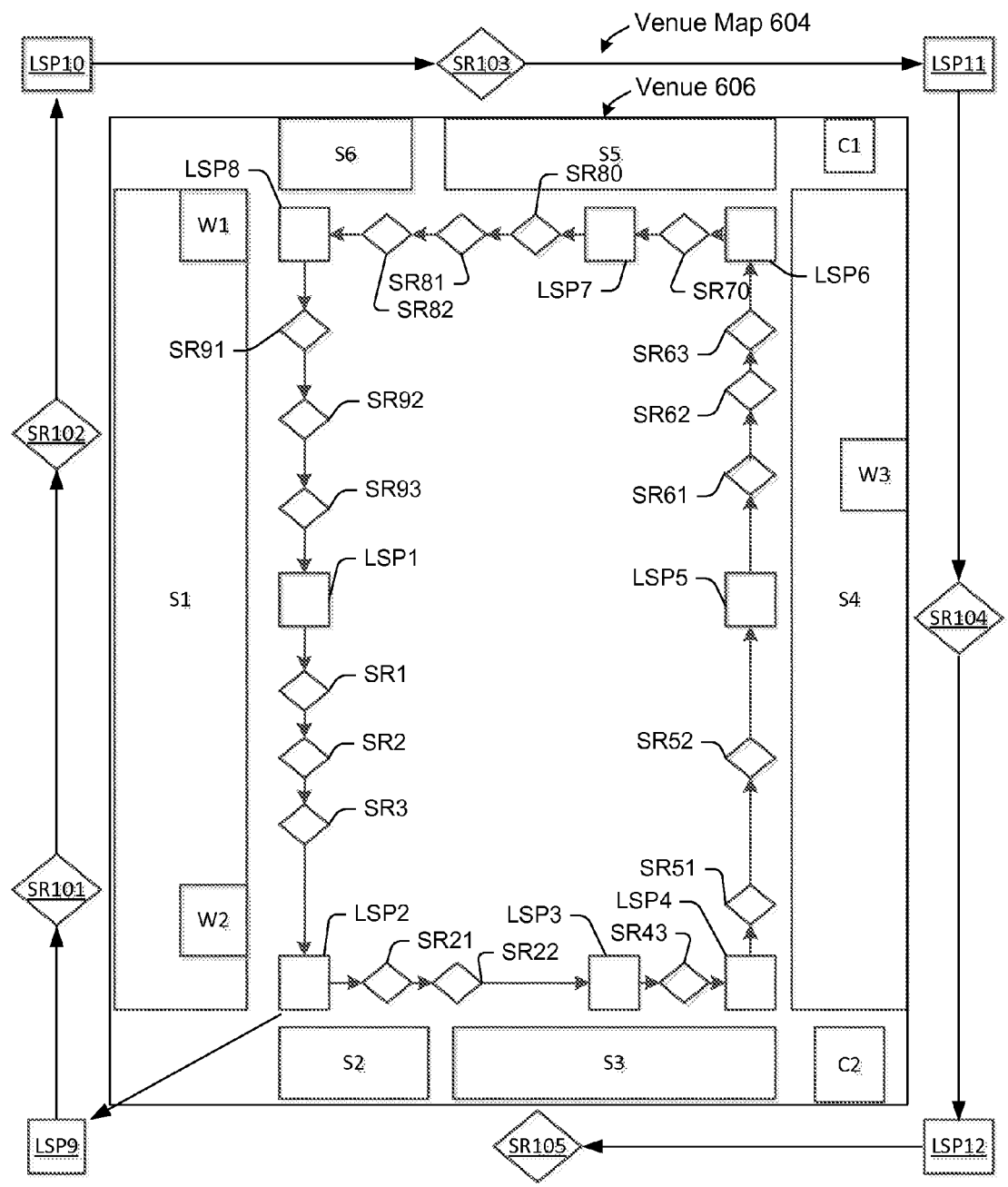
FIG. 6 shows an example venue survey plan in accordance with some implementations.

In the discussion that follows, FIG. 6 describes an example survey technique that can provide venue survey data described above. Of course, the example survey technique is provided for purposes of explanation and other survey techniques are contemplated.

FIG. 6 illustrates an example survey plan 602 associated with a venue map 604 of a venue 606. In this example, the venue 606 is a shopping mall that includes several stores. Of course, other venues can be mapped utilizing similar techniques. This venue map 604 can include representations of several stores (e.g., S1, S2, S3, S4, S5, and S6). Sensor data can be obtained at survey points relative to the stores and/or relative to the venue that includes the stores. Some implementations can utilize the sensed data (e.g. survey data) to build a model of what wireless access points exist in (and/or proximate to) the venue and what their respective signal strengths are at specific points in (and/or around) the venue). Stated another way the survey data can be utilized to build statistical models for signal strengths per wireless access points and/or other signal sources.

The discussion below describes logical survey points, but other types of survey points can be utilized alternatively or additionally to logical survey points. In the illustrated configuration, the survey plan may identify several logical survey points (LSP) (e.g., LSP1, LSP2, LSP3, LSP4, LSP5, LSP6, LSP7, LSP8, LSP9, LSP10, LSP11, and/or LSP12). Note that while all of the logical survey points are proximate to the venue in this example, logical survey points LSP1-LSP8 are inside the venue and logical survey points LSP9-LSP12 are outside the venue.

A surveyor may be provided with instructions that facilitate moving from LSP to LSP in order. As the surveyor travels a path from LSP to LSP, sensor readings may be acquired. For example, a sensor reading (SR) may be acquired at points SR1, SR2, SR3 . . . SR21, SR22, . . . SR 43, . . . SR51, SR52, . . . SR61, SR62, SR63, . . . SR70, . . . SR80, SR81, SR82, . . . SR91, SR92, SR93, . . . SR101, SR102, SR103, SR104, and SR105). This technique can be repeated on additional floors if present. While the LSPs are pre-defined, the precise locations of the SRs may not be pre-planned. The SRs are the places where sensor readings are taken. Sensor readings may be acquired at some sampling rate. As a surveyor passes a logical survey point, an optional action (e.g., tap, button press, shake) may be undertaken to register the surveyor to the LSP. The sensor readings may be taken continuously, after a certain step count has been detected, after a certain time interval has passed, and/or at other times. Further, the sensor readings may be recorded consistently throughout the process or under different conditions. For instance, the frequency of sensor readings may be the same both inside and outside, or the frequency may be different inside than outside, among other configurations.

The sensor readings can relate to external signals (e.g., from outside the sensing device) and/or internal signals (e.g., from inside the sensing device). For instance, external signals can include Wi-Fi signals and/or cellular signals, among others. Internal signals can include signals from compasses, magnetometers, accelerometers, gyroscopes, barometers, etc. on the device. In the illustrated example, the sensor readings may be retrieved from, for example, Wi-Fi access points W1, W2, W3 or from cellular devices C1 and C2, among others. A ground truth (e.g., precise latitude/longitude) may or may not be available for a logical survey point. When a ground truth is available, the venue map 604 can be bound to the survey plan 602 using the ground truth associated with the logical survey point.

These surveying techniques can contribute to accurately locating individual users (e.g., their mobile devices) and to providing maps and/or directions, if desired. Often, users like having maps so that they know where they are, so that they know where they've been, so they'll know how to get from where they are to where they want to be, and/or for other reasons. For example, when in a mall, a shopper may like to know how to get from one store to another store. Similarly, in a large office building, a mail room person may like to know how to get to a particular worker's desk to be able to deliver the mail. Likewise, in a warren of underground sewer pipes, a worker may want to know how to get to a particular clean out valve. Unfortunately, maps about locations can change. For example, there may be two, three, or a dozen revisions of a map for a venue.

Additionally, the physical configuration of a mall, of an office building, or of a network of underground pipes can change. More generally, the physical reality of a physical geography can change or the mapping of a location can change. These changes may happen so rapidly that maps quickly become obsolete or inaccurate. For example, the aisles and booths in a convention center can be changed from event to event. Similarly, the locations of various stores and kiosks in a mall can change. Likewise, the location, size, number, and/or orientation of cubicles in an office can change. Thus, maps can and do get out-of-date. There are additional sources of change. Even if the physical reality of a location remains the same, a map of that location may change due to factors including, but not limited to, corrections and scaling.

Conventional indoor maps for mobile devices have relied on mappings between sensor readings and physical locations (e.g., map locations) on corresponding indoor maps. However, maps for a venue may change from time to time, creating multiple versions of maps for a venue. Additionally, if the physical reality changes, the mapping between sensor readings and physical locations may become out-of-date or obsolete. Even if a user has an accurate GPS fix or an accurate non-GPS fix, that fix is substantially worthless without a binding to an up-to-date map.

Example techniques can anticipate multiple versions of maps, changing maps, and changing physical realities and are configured to facilitate selectively re-binding sensor data acquired for one version of a venue map for use with another version of a venue map. The re-binding is possible, at least in part, because of how the sensor data is acquired in the first place. Example techniques can acquire sensor readings that are relative to logical survey points that may be related to different venue maps rather than being relative to physical co-ordinates on a single fixed map. The sensor readings are bound indirectly to physical locations through an intermediary logical location (e.g., survey point) rather than being bound directly to physical locations. While a binding between a physical location (e.g., map location) and a logical location is made for a particular map of a physical reality as reflected in a particular version of a venue map, the binding can be manipulated over time to accommodate changing physical realities so that the binding will be consistent with the most recent map version. The particular mapping of a physical reality may be represented by one version or instance of a venue map. Thus, an accurate fix may be related to a current map through the relationship between a logical survey point and the current map.

A survey point can be immutable, both logically and in physical reality. Example techniques are configured to handle changes in the mapping of the logical to the pseudo physical reality in different map versions. Consider a survey point described as being a turn around the coffee shop in the mall. A first version of a map (e.g., map1) may map the survey point to {venue name, floor, latitude1, longitude1}. This is pseudo reality version 1. A second version of a map (e.g., map2) may map the survey point to {venue name, floor, latitude2, longitude2). This is pseudo reality version 2. The precise position of the survey point has not been mentioned. Even though the physical realities behind both map versions are the same, the mapping is subject to map accuracy, scaling, and other differences that may exist between the two versions of the map. If the coffee shop actually changed their location so that the survey point became inaccessible, then a new survey point could be created to represent a new turn location.

Example techniques can associate survey plans with the venue map. In one implementation, the survey plan may be part of the metadata for a venue map. The survey plan becomes the basis for indoor and/or outdoor data collection by a surveyor. A survey plan includes at least one survey path. A survey path can be defined by a starting survey point and an ending survey point. In some cases, a survey path can consist of one or more connected segments. A segment can be defined by a starting survey point and an ending survey point. A survey path may also be described by a starting point and a direction of travel. A survey path may also be described in a way that makes it likely that the surveyor will travel along a logical survey path without having to necessarily start at a logical survey point. A survey point is a recognizable location that can be used as a landmark.

Logical survey points may be human recognizable, recognizable by an apparatus, recognizable by a process, and/or recognizable in other ways that do not depend on co-ordinates. For example, a survey point may be described as being near the front door of a certain store while facing the front door of a second store. A logical survey point can have a unique identifier that does not depend on a position described by a co-ordinate system. A logical survey point can include information that describes a recognizable location in the venue associated with the venue map. A logical survey point can store co-ordinate information sufficient for registering the recognizable location with a position on the venue map.

As a surveyor moves from logical survey point to logical survey point, the surveyor can collect sensor information at a number of sensor reading points. The logical survey points can be pre-defined; the sensor reading points are not. The sensor reading points are places where a sensor records sensor information. Sensor readings may be taken on each step of the surveyor, at regular time intervals, and under other controls. In some implementations, the surveyor can start the sensor reading recording at the beginning of the survey. When the recording starts, sensor readings will be recorded continuously at a certain frequency, say 50 Hz. The sensor readings recording does not have to be triggered by the action of the surveyor during the survey process except for perhaps the manual start and stop of the recording on the mobile device. The sensor information can provide a signature or fingerprint for a location. In this context, this sensor information can be termed a survey fingerprint. Conventional systems bind the fingerprints to physical locations on a map using a co-ordinate system. Example techniques can take a more flexible indirect approach of relating the fingerprint to a logical location. An underlying co-ordinate for a fingerprint location may later be generated using a co-ordinate established for the logical location. The logical location may be bound to different maps and thus the fingerprint may also be used in different maps.

In one implementation, a logical survey point may be established at a human recognizable location like a corner or turn that can be used as a landmark during a walking survey of an indoor venue. Conventional systems may also have used survey points. However the conventional survey points were identified by their physical attributes (e.g., latitude/longitude) rather than by their logical attributes (e.g., center of the first aisle, front of a store). Unfortunately, different versions of maps for a location can change or be different. For example, an aisle in a convention center may be rendered in one location on a first version of a map but may be rendered in a second location on a second version of the map. Additionally, the physical co-ordinates of a logical survey point can change from one version of a venue map to another version of a venue map as the physical reality changes. For example, the first aisle in a convention center may be ten feet from the north wall of a convention center for a first event but may be twenty five feet from the north wall of the convention center for a second event. However, for both events, a survey plan could direct a surveyor to start "in the center of the first aisle." The "center of the first aisle" could be bound to different actual physical co-ordinates for the two versions of the venue map.

Example techniques can rely on logical survey points instead of fixed physical survey points. A logical survey point may be identified using something other than a co-ordinate system. For example, a logical survey point may have a name and a unique identifier (e.g., globally unique identifier (GUID)). The unique identifier may be a persistent identifier. For a particular instance of a venue, a logical survey point may be associated with certain physical co-ordinates. However the physical co-ordinates can be provisional. As the map changes from version to version, or as the geography of a venue changes (e.g., wall relocated, walkway relocated, fountain added, fountain removed), the physical co-ordinates of a logical co-ordinate may change. The persistent identifier for the logical survey point may not change from version to version of the venue map. Note that if the physical layout changes, some new survey points may be required as old survey points may become unreachable.

A rigorous survey plan for decoupled sensor data collection can rely on moving from logical survey point to logical survey point and acquiring fingerprints at positions between the logical survey points. Rather than telling a surveyor to start at a specific latitude/longitude co-ordinate, example systems and methods can tell a surveyor to start at the co-ordinates associated with a logical location (e.g., front of store). In some configurations, the surveyor only needs to know/identify the logical locations throughout the survey process and no physical coordinates (latitude/longitude) are involved in the survey process. The binding of the physical location to the logical location can happen later when the sensor data from survey is processed. This can decouple the initial positioning from any particular instance of a map. Although decoupled, the physical co-ordinates of the logical location can be bound to a particular instance of the venue map. Given a map version, a survey point in a given survey plan may be assigned physical co-ordinates for that map version.

The venue map may be described by a venue map data set. The venue map data set may store information including, but not limited to, a name of the venue, a name of the venue map, information about multiple floors of the venue (if present), an identifier of the venue, an identifier of the venue map, a location of the venue, a space represented by the venue map, an element in the space, and/or a symbolic depiction of relationships between elements in the space. In one implementation, the survey plan may be embedded in metadata associated with the venue map.

The survey plan may be described by a survey plan data set. The survey plan data set may store information including, but not limited to, a name of the survey plan, an identifier of the survey plan, and a venue map to which the survey plan applies.

The survey plan can include information about a survey path. In one implementation, a survey path may be defined by a starting logical survey point and an ending logical survey point. In another implementation, a survey path may be defined by a starting logical survey point and a direction to travel. In another implementation, a survey path may be defined using directions that make it likely that a logical survey point will be traversed without requiring either starting or stopping at a logical survey point. In still another implementation, a survey path can include one or more segments. Each segment can be defined by a starting and an ending logical survey point or other types of definitions. Other definitions of survey paths may be employed. In one implementation, a logical survey point includes a unique coordinate free identifier, a description of a recognizable location in the venue, and a coordinate configured to register the logical survey point to the venue map. The coordinate free identifier may be, for example, a persistent globally unique identifier (GUID). Other identifiers may be employed. The description of the recognizable location may take different forms. In different examples the description of the recognizable location may include a textual description of the recognizable location, a visual description of the recognizable location, or a sensor-based description of the recognizable location. By way of illustration, a logical survey point may include a description that reads "position yourself just to the right of the front door of Store1 while facing the clown in front of Restaurant1."

The above mentioned survey related information is provided for purposes of explanation. Of course, other survey techniques are contemplated.

Method Examples

Figure 7:
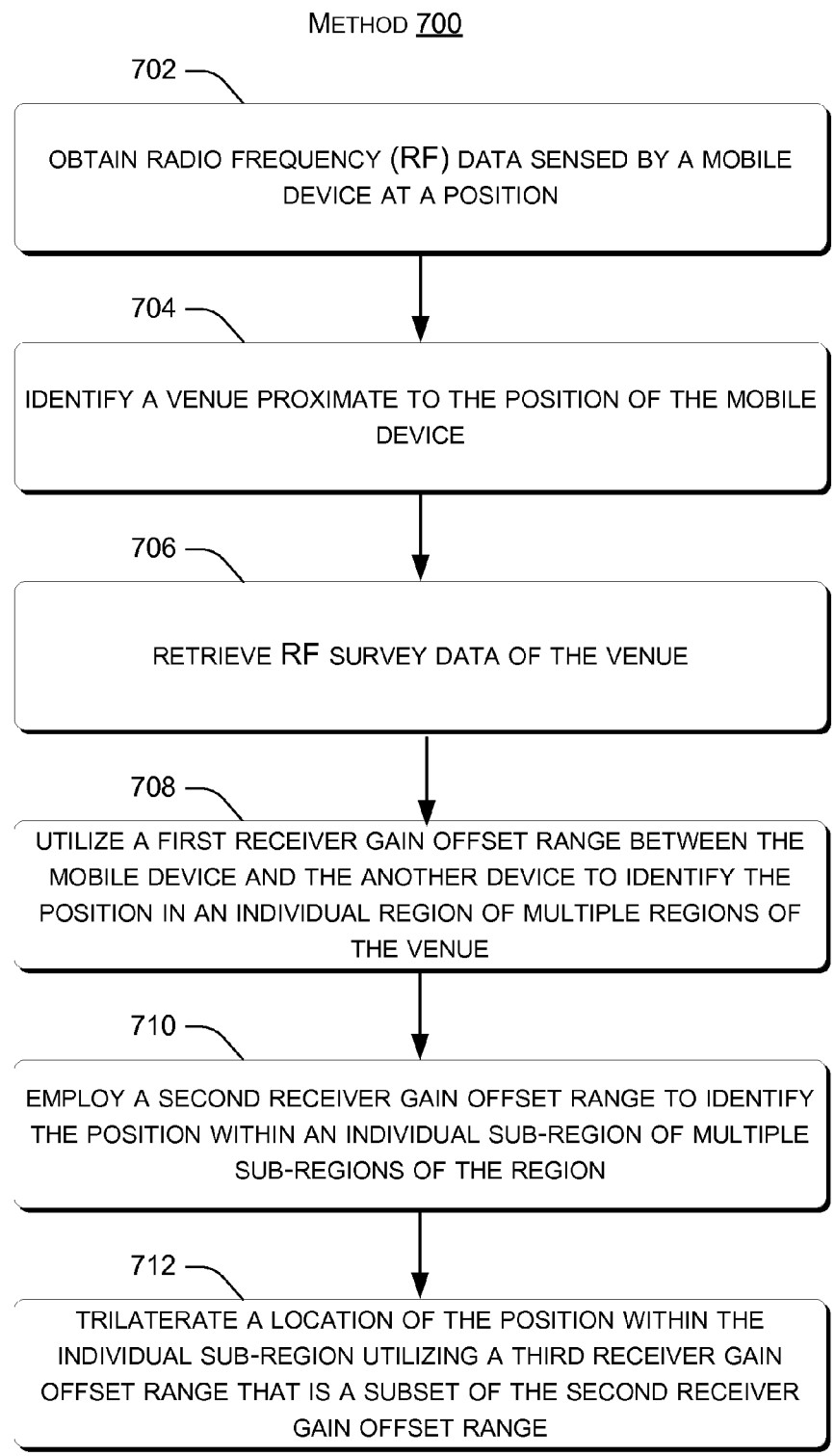
FIGS. 7-8 are flowcharts of examples of mobile device location methods in accordance with some implementations of the present concepts.

FIG. 7 illustrates a flowchart of a method or technique 700 that is consistent with at least some implementations of the present concepts.

At block 702, the method can obtain radio frequency (RF) data sensed by a mobile device at a position. The mobile device can be characterized as having a first receiver sensitivity.

At block 704, the method can identify a venue proximate to the position of the mobile device. For instance, the method can match wireless access point IDs sensed by the mobile device to those found in survey data. The survey data can identify what venue the matching wireless access points are located.

At block 706, the method can retrieve RF survey data of the venue. The RF survey data can be obtained by another device. For instances, another device may have functioned as a survey device to gather survey data, such as survey fingerprints, at various survey points proximate to the venue. The survey data can be stored until retrieved at block 706.

At block 708, the method can utilize a first receiver gain offset range between the mobile device and the another device (e.g., survey device) to identify the position in an individual region of multiple regions of the venue.

At block 710, the method can employ a second receiver gain offset range to identify the position within an individual sub-region of multiple sub-regions of the region. The second receiver gain offset range can be a sub-range of the first receiver gain offset range.

At block 712, the method can trilaterate a location of the position within the individual sub-region utilizing a third receiver gain offset range that is a subset of the second receiver gain offset range.

Figure 8:
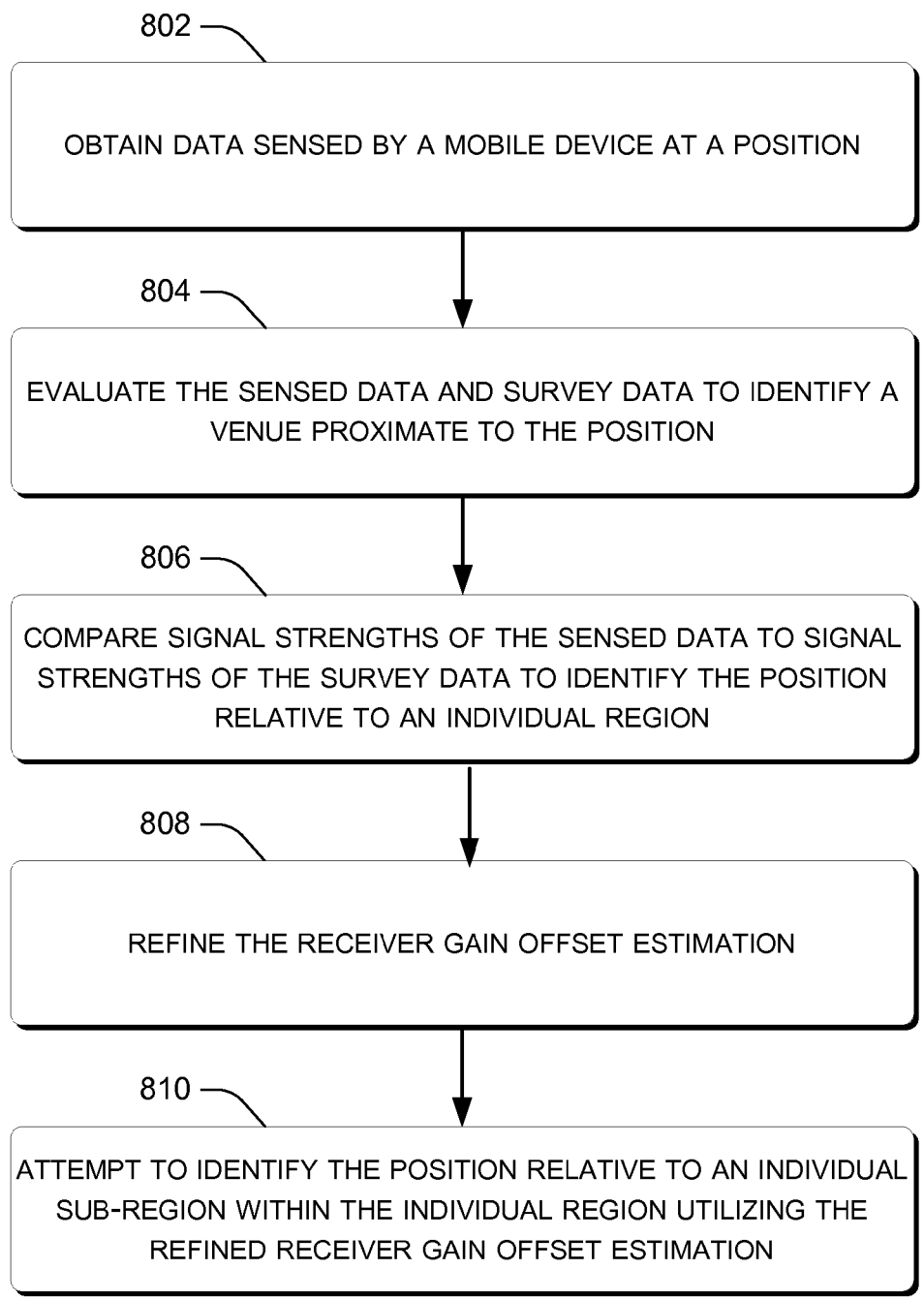

FIG. 8 illustrates another flowchart of a method or technique 800 that is consistent with at least some implementations of the present concepts.

At block 802, the method can obtain data sensed by a mobile device at a position.

At block 804, the method can evaluate the sensed data and survey data to identify a venue proximate to the position.

The survey data of the venue can be organized into regions and then individual regions organized into sub-regions.

At block 806, the method can compare signal strengths of the sensed data to signal strengths of the survey data to identify the position relative to an individual region. The comparing can utilize a receiver gain offset estimation between the mobile device and another device that acquired the survey data.

At block 808, the method can refine the receiver gain offset estimation.

At block 810, the method can attempt to identify the position relative to an individual sub-region within the individual region utilizing the refined receiver gain offset estimation. Some implementations can further refine the refined receiver gain offset estimation. These implementations can also attempt to identify a location of the position within the individual sub-region utilizing the further refined receiver gain offset estimation. In one example, the location can be identified with latitude and longitude coordinates and/or relative to the venue, such as "at this location in this zone, of this floor of this venue."

The order in which the above methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method (e.g., computer-implemented method). In one case, the method is stored on a computer-readable storage media as a set of instructions such that execution by a processor of a computing device causes the computing device to perform the method.

CONCLUSION

Although techniques, methods, devices, systems, etc., pertaining to location-aware implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A mobile device which uses a receiver gain offset to determine a position, the device comprising:
   one or more processors;
   a sensor configured to sense radio frequencies; and
   storage, the storage having instructions stored thereon that when executed by the one or more processors configure the device to perform:
      sensing values of one or more radio frequencies at a position;
      calculating a location of the device using the sensed radio frequencies and survey data previously stored in a data store;
      calculating an estimated receiver gain offset for the device based on the calculated location, a signal strength of the sensed radio frequencies, and a signal strength of the survey data, the receiver gain offset being a measure of a difference in of a receiver gain of the device and a receiver gain of a survey device used to acquire the survey data;
      caching the estimated receiver gain offset on the mobile device;
      sensing second values of one or more radio frequencies at a subsequent position;
      calculating a corresponding subsequent location by using the sensed second values of one or more radio frequencies, the cached estimated receiver gain offset, and the previously stored survey data; and
      refining the estimated receiver gain offset based on the calculated corresponding subsequent location, the sensed second values of one or more radio frequencies, the cached estimated receiver gain offset, and the survey data.

2. The mobile device of claim 1, wherein the caching comprises caching the estimated receiver gain offset on the storage.

3. The mobile device of claim 1, wherein the utilizing the cached estimated receiver gain offset comprises sending the cached estimated receiver gain offset and the sensed values from the location to a location service to obtain the corresponding subsequent location.

4. The mobile device of claim 1, wherein the utilizing the cached estimated receiver gain offset comprises obtaining survey data from a location service and determining the corresponding subsequent location on the mobile device.

5. The mobile device of claim 1, wherein the sensor comprises a receiver coupled to an antenna.

6. The mobile device of claim 1, manifest as a smart phone, a smart wearable device, or a tablet.

* * * * *